(12) United States Patent
Shinohara

(10) Patent No.: US 12,014,476 B2
(45) Date of Patent: Jun. 18, 2024

(54) UPSCALING DEVICE, UPSCALING METHOD, AND UPSCALING PROGRAM

(71) Applicant: SONY INTERACTIVE ENTERTAINMENT INC., Tokyo (JP)

(72) Inventor: Takayuki Shinohara, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 339 days.

(21) Appl. No.: 17/638,467

(22) PCT Filed: Sep. 17, 2019

(86) PCT No.: PCT/JP2019/036430
§ 371 (c)(1),
(2) Date: Feb. 25, 2022

(87) PCT Pub. No.: WO2021/053735
PCT Pub. Date: Mar. 25, 2021

(65) Prior Publication Data
US 2022/0318951 A1    Oct. 6, 2022

(51) Int. Cl.
*G06T 3/4076* (2024.01)
*G06T 3/4069* (2024.01)

(52) U.S. Cl.
CPC .......... *G06T 3/4076* (2013.01); *G06T 3/4069* (2013.01)

(58) Field of Classification Search
None
See application file for complete search history.

(56) References Cited

U.S. PATENT DOCUMENTS 5,701,365 A * 12/1997 Harrington ............... G06T 5/50
382/269
10,839,577 B2 * 11/2020 Horie .................... G06T 3/4053
(Continued)

FOREIGN PATENT DOCUMENTS

JP   2008-165792 A   7/2008
JP   2019-121150 A   7/2019

OTHER PUBLICATIONS

International Search Report and Written Opinion mailed Nov. 19, 2019, from PCT/JP2019/036430, 6 sheets.

*Primary Examiner* — Anand P Bhatnagar
(74) *Attorney, Agent, or Firm* — XSENSUS LLP

(57) ABSTRACT

Provided are an upscaling device, an upscaling method, and an upscaling program capable of keying processing at low cost and with high accuracy. An upscaling device includes an image obtaining section configured to obtain a high-resolution input image illustrating a background and a foreground, a low-resolution input image obtained by converting the high-resolution input image into a low-resolution image, and a low-resolution alpha image illustrating a region of the foreground in the low-resolution input image; a correlation obtaining section configured to obtain correlation between grayscale information of the low-resolution input image and an alpha value of the low-resolution alpha image for each corresponding pixel pair of the low-resolution input image and the low-resolution alpha image, and upscale the correlation into a resolution of the high-resolution input image; and an output section configured to output a high-resolution alpha image having a resolution same as that of the high-resolution input image on a basis of the high-resolution input image and the upscaled correlation.

6 Claims, 5 Drawing Sheets

(56) References Cited

U.S. PATENT DOCUMENTS

| | | | |
|---|---|---|---|
| 11,004,208 B2* | 5/2021 | Price | G06N 3/045 |
| 11,880,977 B2* | 1/2024 | Price | G06T 3/40 |
| 2006/0133690 A1* | 6/2006 | Bloomberg | H04N 1/41 382/269 |
| 2010/0302367 A1* | 12/2010 | Hsu | G08B 13/19604 382/167 |
| 2015/0302612 A1* | 10/2015 | Ishikawa | G06T 11/40 345/590 |
| 2017/0244908 A1* | 8/2017 | Flack | G11B 27/036 |
| 2019/0080498 A1* | 3/2019 | Horie | G06T 3/4053 |
| 2020/0258196 A1* | 8/2020 | Kokura | G06T 3/4076 |
| 2020/0311946 A1* | 10/2020 | Price | G06T 3/40 |
| 2021/0256708 A1* | 8/2021 | Price | G06N 3/088 |

* cited by examiner

FIG.4
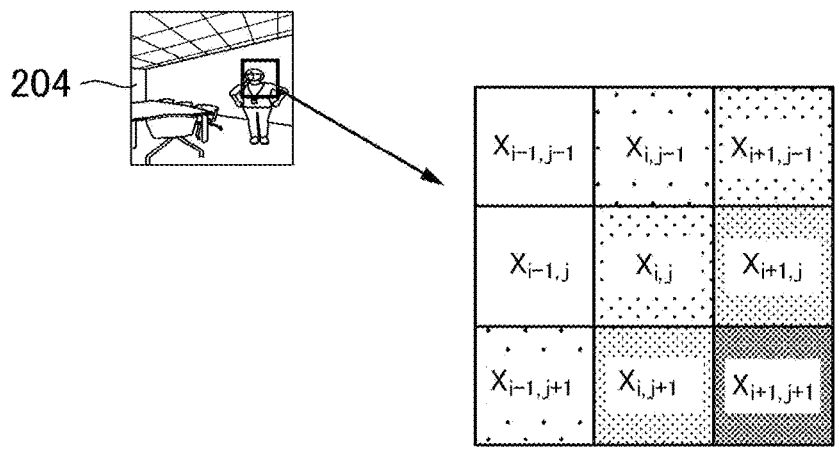
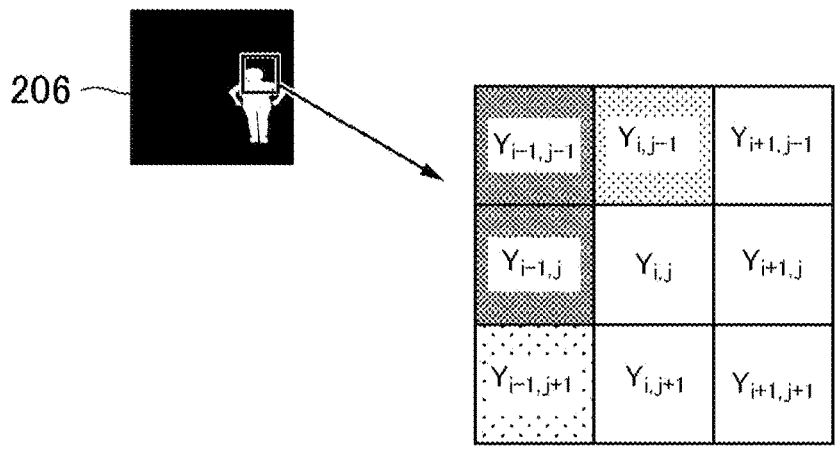
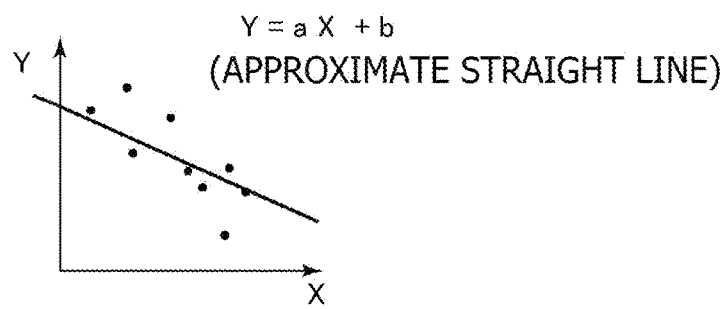

UPSCALING DEVICE, UPSCALING METHOD, AND UPSCALING PROGRAM

TECHNICAL FIELD

The present invention relates to an upscaling device, an upscaling method, and an upscaling program.

BACKGROUND ART

Technologies such as background differencing and keying are known which generate estimated data indicating a region of a foreground from an image including a background and the foreground. Background differencing is a technology that estimates regions of the foreground and the background by, for example, extracting a difference between a first input image illustrating the background and the foreground and a second input image illustrating the background. The first input image is, for example, a person image or the like in which the background is natural scenery. Keying includes, for example, a technology referred to as a chromakey, which photographs an image whose background is unified in a specific color, and merges another image in a region of the specific color in the image.

SUMMARY

Technical Problems

Keying is performed by an information processing device such as a personal computer. As the resolution of an input image used for keying becomes higher, a processing load on the information processing device is increased. Therefore, in a case where keying processing is performed on a moving image, keying processing on one input image may not be completed within the period of one frame. The completion of the keying processing within the period of one frame necessitates improving the processing power of the information processing device or converting the input image into a low-resolution image to reduce the processing load. However, improvement in processing power of the information processing device involves an increase in cost. In addition, in a case where the input image is converted into a low-resolution image, a problem of degradation in accuracy of the keying processing occurs.

The present invention has been made in view of the above problems. It is an object of the present invention to provide an upscaling device, an upscaling method, and an upscaling program capable of keying processing at low cost and with high accuracy.

Solution to Problems

In order to solve the above problems, according to the present invention, there is provided an upscaling device including an image obtaining section configured to obtain a high-resolution input image illustrating a background and a foreground, a low-resolution input image obtained by converting the high-resolution input image into a low-resolution image, and a low-resolution alpha image illustrating a region of the foreground in the low-resolution input image; a correlation obtaining section configured to obtain correlation between grayscale information of the low-resolution input image and an alpha value of the low-resolution alpha image for each corresponding pixel pair of the low-resolution input image and the low-resolution alpha image, and upscale the correlation into a resolution of the high-resolution input image; and an output section configured to output a high-resolution alpha image having a resolution same as that of the high-resolution input image on the basis of the high-resolution input image and the upscaled correlation.

In this aspect, the correlation includes a constant of a function indicating a relation between a grayscale value and an alpha value, and the upscaling is performed by linear interpolation of the constant.

In this aspect, the function of the pixel pair indicates a relation of a predetermined number of pixel pairs on a periphery of the pixel pair.

In this aspect, the correlation obtaining section further obtains a correlation coefficient indicating a degree of linear relation between the grayscale value and the alpha value, for each pixel pair. Using the correlation coefficient as a weighting factor, the output section obtains a weighted average of an alpha value calculated on the basis of the high-resolution input image and the upscaled correlation and an alpha value calculated by upscaling the low-resolution alpha image.

According to the present invention, there is provided an upscaling method including an image obtaining step of obtaining a high-resolution input image illustrating a background and a foreground, a low-resolution input image obtained by converting the high-resolution input image into a low-resolution image, and a low-resolution alpha image illustrating a region of the foreground in the low-resolution input image; a correlation obtaining step of obtaining correlation between grayscale information of the low-resolution input image and an alpha value of the low-resolution alpha image for each corresponding pixel pair of the low-resolution input image and the low-resolution alpha image, and upscaling the correlation into a resolution of the high-resolution input image; and an output step of outputting a high-resolution alpha image having a resolution same as that of the high-resolution input image on the basis of the high-resolution input image and the upscaled correlation.

According to the present invention, there is provided an upscaling program for making a computer perform an image obtaining procedure of obtaining a high-resolution input image illustrating a background and a foreground, a low-resolution input image obtained by converting the high-resolution input image into a low-resolution image, and a low-resolution alpha image illustrating a region of the foreground in the low-resolution input image; a correlation obtaining procedure of obtaining correlation between grayscale information of the low-resolution input image and an alpha value of the low-resolution alpha image for each corresponding pixel pair of the low-resolution input image and the low-resolution alpha image, and upscaling the correlation into a resolution of the high-resolution input image; and an output procedure of outputting a high-resolution alpha image having a resolution same as that of the high-resolution input image on the basis of the high-resolution input image and the upscaled correlation.

BRIEF DESCRIPTION OF DRAWINGS

FIG. 4 is a diagram of assistance in explaining correlation.

DESCRIPTION OF EMBODIMENTS

Figure 1:
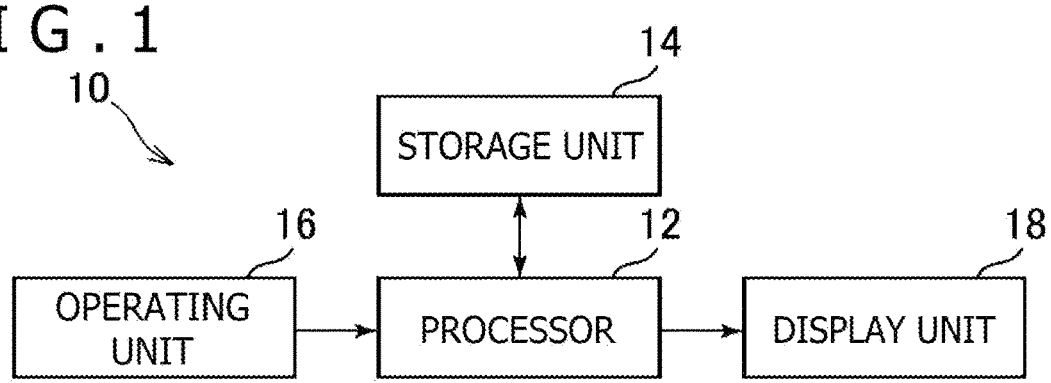
FIG. 1 is a block diagram of an upscaling device according to one embodiment of the present invention.

One embodiment of the present invention will hereinafter be described in detail with reference to the drawings. FIG. 1 is a block diagram of an image processing device 10 according to the present embodiment.

The image processing device 10 according to the present embodiment is, for example, a computer such as a game console or a personal computer. As illustrated in FIG. 1, the image processing device 10 according to the present embodiment includes, for example, a processor 12, a storage unit 14, an operating unit 16, and a display unit 18.

The processor 12 is, for example, a program control device such as a central processing unit (CPU) that operates according to a program installed on the image processing device 10.

The storage unit 14 is a storage element such as a read only memory (ROM) or a random access memory (RAM), a hard disk drive, or the like. The storage unit 14 stores therein a program executed by the processor 12 and the like.

The operating unit 16 is a user interface such as a keyboard, a mouse, and a controller of a game console. The operating unit 16 receives an operating input made by a user and outputs a signal indicating contents of the operating input to the processor 12.

The display unit 18 is a display device such as a liquid crystal display. The display unit 18 displays various kinds of images according to instructions of the processor 12.

Incidentally, the image processing device 10 may include a communication interface such as a network board, an optical disk drive that reads information from an optical disk such as a digital versatile disk (DVD)-ROM or a Blu-ray (registered trademark) disk, a universal serial bus (USB) port, and the like.

Figure 2:
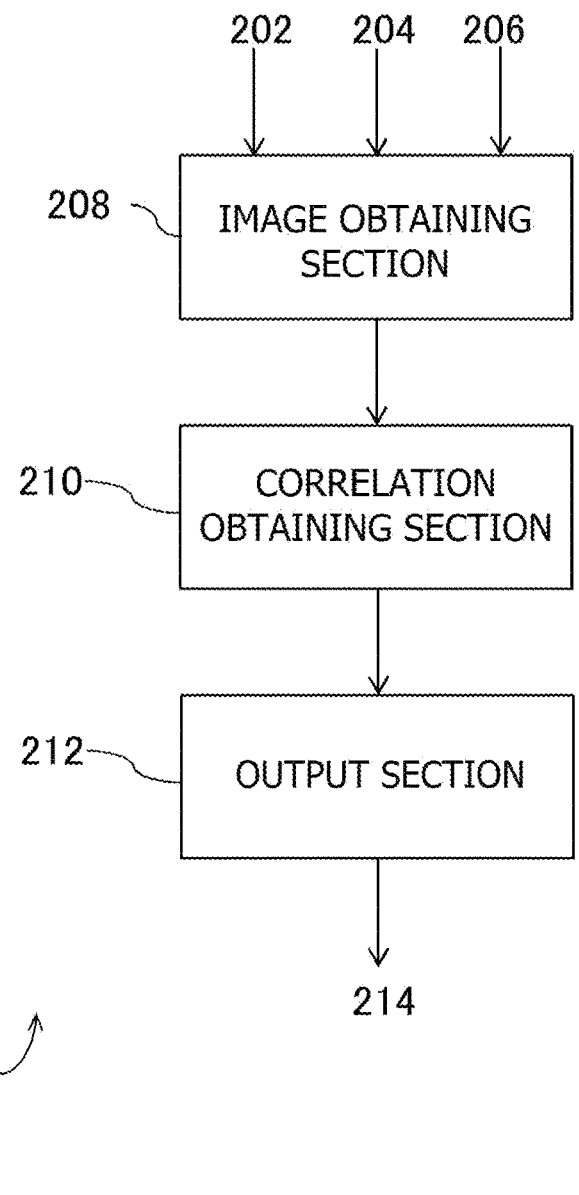
FIG. 2 is a functional block diagram illustrating an example of functions implemented by an upscaling device according to one embodiment of the present invention.

FIG. 2 is a functional block diagram illustrating an example of functions implemented by an upscaling device according to one embodiment of the present invention. As illustrated in FIG. 2, the upscaling device functionally includes an image obtaining section 208, a correlation obtaining section 210, and an output section 212.

The image obtaining section 208 obtains a high-resolution input image 202 illustrating a background and a foreground, a low-resolution input image 204 obtained by converting the high-resolution input image 202 into a low-resolution image, and a low-resolution alpha image 206 illustrating a region of the foreground in the low-resolution input image 204. Specifically, for example, the high-resolution input image 202 is an image of 1920 pixels in a vertical direction and 1080 pixels in a horizontal direction, and is an image obtained by photographing a person (foreground) with the wall of a conference room and a table as the background. The low-resolution input image 204 is an image obtained by linearly converting the high resolution of the high-resolution input image 202 into a low resolution, and is an image of 320 pixels in the vertical direction and 320 pixels in the horizontal direction. Aspect ratios of the high-resolution input image 202 and the low-resolution input image 204 may be different from each other. In this case, compression ratios in the vertical direction and the horizontal direction are different from each other. The low-resolution alpha image 206 is an image obtained by subjecting the low-resolution input image 204 to keying processing. The low-resolution alpha image 206 has a resolution same as that of the low-resolution input image 204. Here, the alpha image is an image having an alpha value of 1 at coordinates indicating the foreground and having an alpha value of 0 at coordinates indicating the background. Incidentally, the alpha value is not limited to the case where the alpha value is a value of either 0 or 1. For example, the alpha value may be a real number equal to or more than 0 and equal to or less than 1, or may be an integer between 0 and 255.

Figure 3:
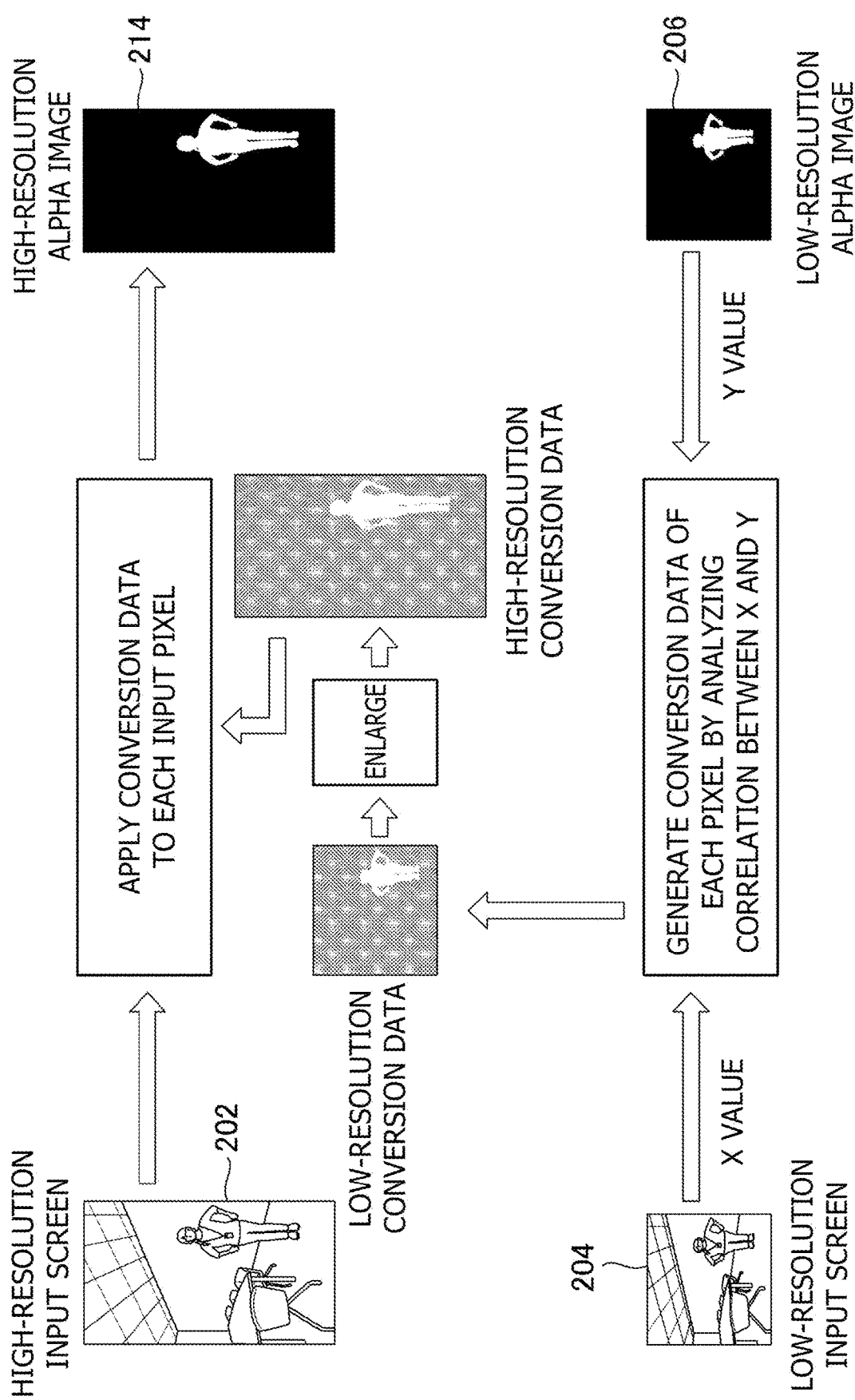
FIG. 3 is a diagram illustrating an example of a flow of processing performed by an upscaling device according to one embodiment of the present invention.

The correlation obtaining section 210 obtains correlation between grayscale information of the low-resolution input image 204 and an alpha value of the low-resolution alpha image 206 for each corresponding pixel pair of the low-resolution input image 204 and the low-resolution alpha image 206, and upscales the correlation into the resolution of the high-resolution input image 202. Processing performed by the correlation obtaining section 210 will be described specifically with reference to FIG. 3 and FIG. 4.

First, the correlation obtaining section 210 obtain a function representing a relation between a grayscale value and an alpha value of a corresponding pixel pair (combination of pixels located at same coordinates) of the low-resolution input image 204 and the low-resolution alpha image 206. For example, as illustrated in FIG. 4, the function of the pixel pair indicates a relation of a predetermined number of pixel pairs on the periphery of the pixel pair. Specifically, the grayscale value of a green pixel at coordinates (i, j) of the low-resolution input image 204 is $X_{i,j}$. The grayscale values of green pixels in eight pixels surrounding the coordinates (i, j) from upper, lower, left, and right sides are $X_{i-1, j-1}$ to $X_{i+1, j+1}$. The alpha value at the coordinates (i, j) of the low-resolution alpha image 206 is $Y_{i,j}$. The alpha values at the eight pixels surrounding the periphery of the coordinates (i, j) are $Y_{i-1, j-1}$ to $Y_{i+1, j+1}$.

Next, the correlation obtaining section 210 approximates a relation between the X values and the Y values of the pixel pair at the coordinates (i, j) and the eight pixel pairs surrounding the periphery of the coordinates (i, j) by a function by using Math. 1. A graph in a lower part of FIG. 4 is a diagram obtained by plotting the relation between the X values and the Y values of the nine pixel pairs. The function is expressed by an equation presented as Math. 1, for example. An 'a' value and a 'b' value in Math. 1 are calculated by a least-square method, for example.

$$Y = aX + b \qquad \text{[Math. 1]}$$

The correlation obtaining section 210 calculates 'a' values and 'b' values for all pixel pairs of the low-resolution input image 204 and the low-resolution alpha image 206. Here, the 'a' values and the 'b' values are calculated while associated with the coordinates of the respective pixel pairs. That is, the number of 'a' values and 'b' values calculated is the same as the number of pixels of the low-resolution input image 204 and the low-resolution alpha image 206. A set of the 'a' values and the 'b' values will be referred to as conversion data. In addition, the conversion data having a resolution same as that of the low-resolution input image 204 and the low-resolution alpha image 206 will be referred to as low-resolution conversion data.

Here, pixels at edge portions and corner portions of the low-resolution input image 204 and the low-resolution alpha image 206 do not have eight pixels on the peripheries thereof. For pixel pairs at the edge portions and the corner portions, 'a' values and 'b' values may be calculated by using five or three pixel pairs on the peripheries, or the 'a' values and the 'b' values may be calculated by using more pixel pairs located near the pixel pairs as appropriate.

Next, the correlation obtaining section 210 upscales the low-resolution conversion data. The upscaling is performed by linear interpolation of constants. Specifically, for example, the correlation obtaining section 210 increases the resolution of the obtained low-resolution conversion data (increases the resolution of the obtained low-resolution conversion data by a factor of a constant in the horizontal direction and in the vertical direction), and performs linear interpolation of the 'a' values and the 'b' values. The correlation obtaining section 210 thereby obtains high-resolution conversion data having a resolution same as that of the high-resolution input image 202. The 'a' values and the 'b' values included in the obtained high-resolution conversion data represent correlation between the grayscale information and the alpha values. That is, the correlation between the grayscale information and the alpha values is expressed by constants of the function indicating the relation between the grayscale values and the alpha values.

The output section 212 outputs a high-resolution alpha image having a resolution same as that of the high-resolution input image 202 on the basis of the high-resolution input image 202 and the upscaled correlation. Specifically, the grayscale value of a green pixel at the coordinates (i, j) of the high-resolution input image 202 is set as $X_{i,j}$, and the alpha value at the coordinates (i, j) of the high-resolution alpha image is set as $Y_{i,j}$. The output section 212 outputs the high-resolution alpha image by applying the upscaled correlation (that is, the high-resolution conversion data) to $X_{i,j}$ at respective coordinates of the high-resolution input image 202. Here, the output section 212 calculates $Y_{i,j}$ from $X_{i,j}$ by using the above-described Math. 1.

As described above, according to the present invention, the high-resolution alpha image is obtained by using the high-resolution input image 202. It is thereby possible to obtain a high-resolution alpha image with higher accuracy than in a case where a high-resolution alpha image is obtained by simply enlarging the low-resolution alpha image 206 (for example, enlarging the low-resolution alpha image 206 by a factor of a constant in the horizontal direction and in the vertical direction).

The above functions may be implemented by the processor 12 executing a program that includes commands corresponding to the above functions and has been installed on the image processing device 10 as a computer. This program may, for example, be supplied to the image processing device 10 via a computer-readable information storage medium such as an optical disk, a magnetic disk, a magnetic tape, a magneto-optical disk, or a flash memory or via the Internet or the like.

The relation between the grayscale values and the alpha values may be approximated by a function other than the above-described Math. 1. In addition, the high-resolution alpha image may be obtained by using a correlation coefficient besides the correlation. For example, the correlation obtaining section 210 may further obtain, for each pixel pair, a correlation coefficient indicating a degree of linear relation between the grayscale value and the alpha value. Then, using the correlation coefficient as a weighting factor, the output section 212 may obtain a weighted average of an alpha value calculated on the basis of the high-resolution input image 202 and the upscaled correlation and an alpha value calculated by upscaling the low-resolution alpha image 206.

Specifically, first, averages of grayscale values and alpha values, variances, and covariances in the pixel pair at the coordinates (i, j) and the eight pixel pairs surrounding the periphery of the coordinates (i, j) are expressed by Math. 2 to Math. 6. Incidentally, 'k' is a variable whose value is 'i−1,' 'i,' or 'i+1,' and 'l' is a variable whose value is 'j−1,' ' j, ' or' j+1.'

$$\overline{X}(\text{average of grayscale values}) = \frac{1}{N}\sum_{k,l} X_{k,l} \quad [\text{Math. 2}]$$

$$\overline{Y}(\text{average of alpha values}) = \frac{1}{N}\sum_{k,l} Y_{k,l} \quad [\text{Math. 3}]$$

$$\sigma_X(\text{square root of variance of grayscale values}) = \quad [\text{Math. 4}]$$

$$\sqrt{\frac{1}{N}\sum_{k,l}(X_{k,l}-\overline{X})}$$

$$\sigma_Y(\text{square root of variance of alpha values}) = \quad [\text{Math. 5}]$$

$$\sqrt{\frac{1}{N}\sum_{k,l}(Y_{k,l}-\overline{Y})}$$

$$\sigma_{XY}(\text{covariance of grayscale values and alpha values}) = \quad [\text{Math. 6}]$$

$$\frac{1}{N}\sum_{k,l}(X_{k,l}-\overline{X})(Y_{k,l}-\overline{Y})$$

The correlation obtaining section 210 calculates constants 'a,' 'b,' and 'c' and a correlation coefficient 'd' constituting conversion data on the basis of the pixel pair at the coordinates (i, j) and the eight pixel pairs surrounding the periphery of the coordinates (i, j), by using Math. 7 to Math. 10.

$$a = X_{i,j}(\text{in cases where}\, \sigma_X < 0.05\, \text{or}\, \sigma_Y < 0.05), \quad [\text{Math. 7}]$$

$$a = \overline{X}(\text{in cases where}\, \sigma_X \geq 0.05\, \text{and}\, \sigma_Y \geq 0.05)$$

$$b = Y_{i,j}(\text{in cases where}\, \sigma_X < 0.05\, \text{or}\, \sigma_Y < 0.05), \quad [\text{Math. 8}]$$

$$a = \overline{Y}(\text{in cases where}\, \sigma_X \geq 0.05\, \text{and}\, \sigma_Y \geq 0.05)$$

$$c = 0(\text{in cases where}\, \sigma_X < 0.05\, \text{or}\, \sigma_Y < 0.05), \quad [\text{Math. 9}]$$

$$c = \tan^{-1}\frac{\sigma_{XY}}{\sigma_X^2}(\text{in cases where}\, \sigma_X \geq 0.05\, \text{and}\, \sigma_Y \geq 0.05)$$

$$d = 0(\text{in cases where}\, \sigma_X < 0.05\, \text{or}\, \sigma_Y < 0.05), \quad [\text{Math. 10}]$$

$$d = \left|\frac{\sigma_{XY}}{\sigma_X\sigma_Y}\right|(\text{in cases where}\, \sigma_X \geq 0.05\, \text{and}\, \sigma_Y \geq 0.05)$$

According to 'a,' 'b,' and 'c' described above, the relation between an X value and a Y value is expressed by the following function.

$$Y=(X-a)\tan c+b \quad [\text{Math. 11}]$$

The low-resolution conversion data constituted by 'a,' 'b,' 'c,' and 'd' thus calculated is converted into high-resolution conversion data by linear interpolation in a manner similar to the above description.

Then, using the correlation coefficient as a weighting factor, the output section 212 obtains a weighted average of an alpha value (set as 'v') calculated on the basis of the high-resolution input image 202 and the upscaled correlation (that is, the high-resolution conversion data) and an alpha value (set as 'w') calculated by upscaling the low-resolution alpha image 206. Specifically, the alpha value 'v' is expressed by Math. 12.

$$v=\text{clamp}((X-a)\tan c+b) \quad [\text{Math. 12}]$$

Incidentally, X is the grayscale value of a green pixel of the high-resolution input image 202. Math. 12 indicates that Math. 11 is applied to the grayscale value of the high-resolution input image 202, and the value obtained as a result of the application is converted into 0 when it is equal to or less than 0 and converted into 1 when it is 1 or more. In addition, the alpha value 'w' is obtained by increasing the resolution of the low-resolution alpha image 206 (increasing the resolution of the low-resolution alpha image 206 by a factor of a constant in the horizontal direction and in the vertical direction), and performing linear interpolation. Further, using the correlation coefficient 'd' as a weighting factor, the output section 212 obtains a weighted average of the alpha value 'v' and the alpha value 'w.' An output alpha value (set as 'J') is expressed by Math. 13.

$$J = v \times d + w \times (1-d) \quad \text{[Math. 13]}$$

As compared with the case where Math. 1 is used, the use of a function as indicated in Math. 11 enables the constants 'a,' 'b,' and 'c' constituting the conversion data to be defined as a fixed point rather than a floating point when implemented in a program. Specifically, for example, in the case where Math. 1 is used, ranges of possible values of 'a' and 'b' are all of real number values (from negative infinity to positive infinity). On the other hand, in the case where Math. 11 is used, the possible ranges of 'a,' 'b,' and 'c' are finite real number ranges. Hence, in the case where Math. 11 is used, the constants 'a,' 'b,' and 'c' can be defined as a fixed point. The memory capacity used in the image processing device 10 can thereby be reduced. In addition, while dependence on the constants 'a' and 'b' is increased when linear approximation as in Math. 1 is used, the use of a function as indicated in Math. 11 can reduce an adverse effect of an error in numerical calculation such as quantization when the low-resolution conversion data is upscaled.

The above description has been made of a case where the Y values are the grayscale values of green pixels. However, the grayscale values of pixels of another color may be used, or the grayscale values of pixels of all colors may be used. In addition, description has been made of a case where the correlation and the correlation coefficient are calculated on the basis of the pixel pair at the coordinates (i, j) and the eight pixel pairs surrounding the periphery of the coordinates (i, j). However, this is not limitative. For example, the pixel pair at the coordinates (i, j) and four pixel pairs on the upper, lower, left, and right sides of the pixel may be used, or pixel pairs present in a range of two pixels in the vertical direction and in the horizontal direction may be used.

Figure 5:
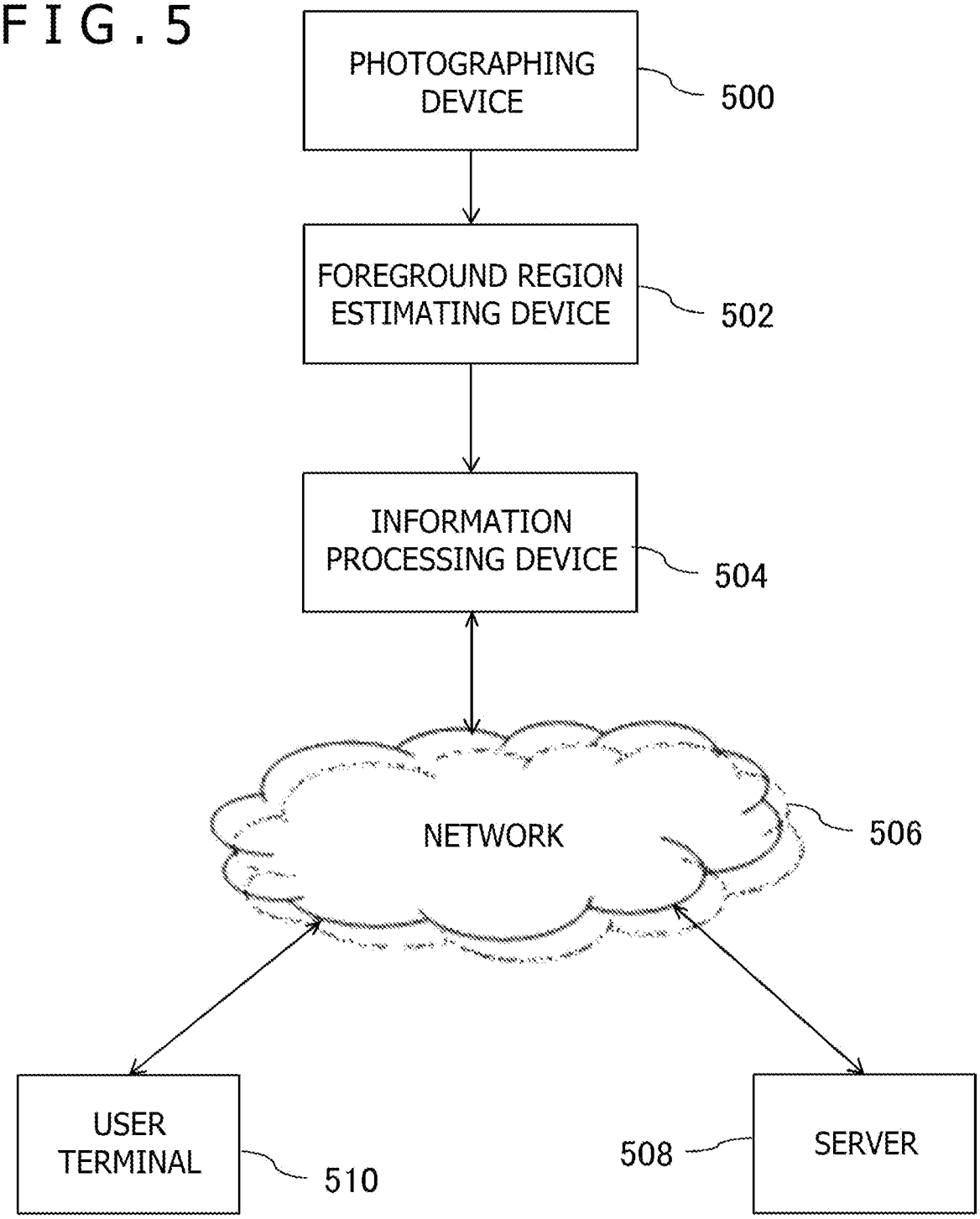
FIG. 5 is a diagram illustrating an example of an embodiment to which the present invention is applied.
Figure 6:
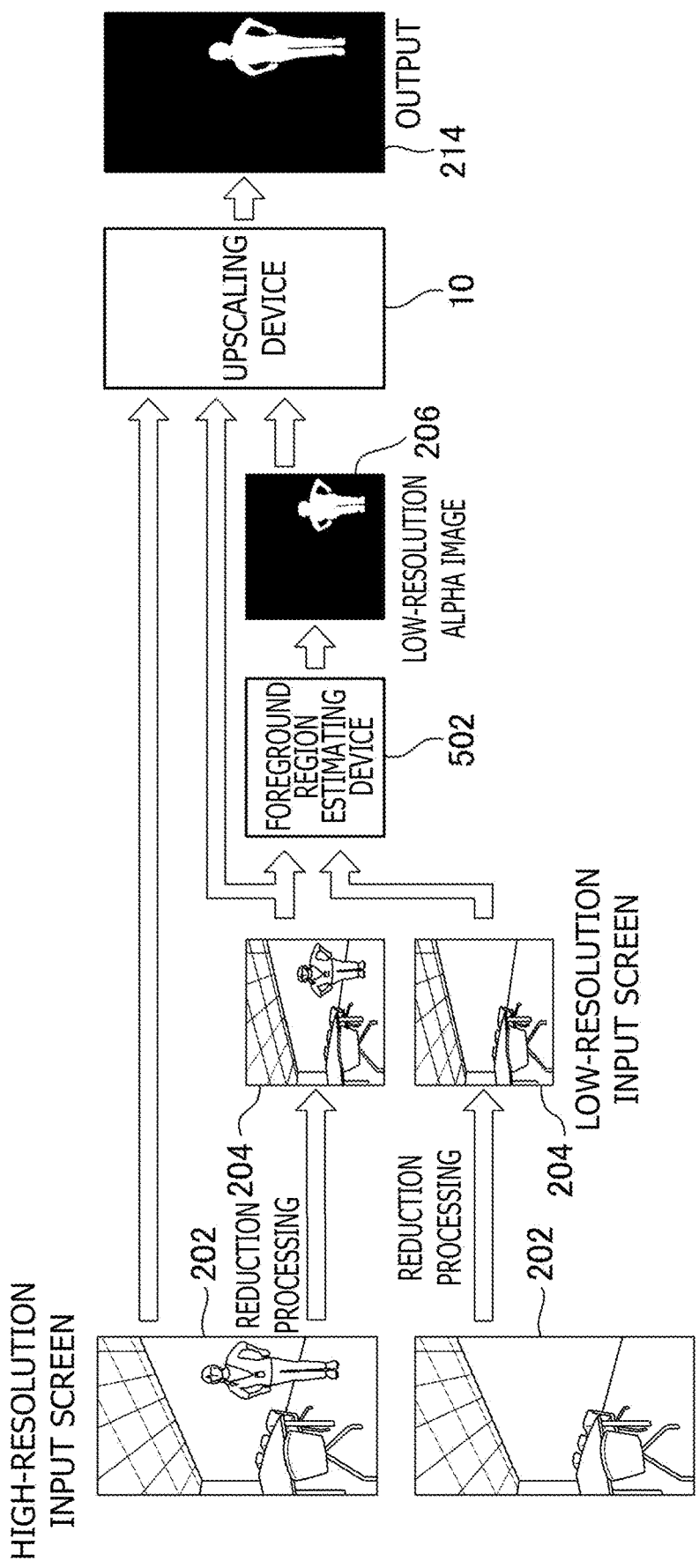
FIG. 6 is a diagram illustrating an example of a flow of image processing performed in the embodiment to which the present invention is applied.

An example of an embodiment to which the present invention is applied will next be described. FIG. 5 is a diagram illustrating an example of an embodiment to which the present invention is applied. FIG. 6 is a diagram illustrating an example of a flow of image processing performed in the embodiment to which the present invention is applied.

The embodiment illustrated in FIG. 5 includes a photographing device 500, a foreground region estimating device 502, an information processing device 504, a server 508, and a user terminal 510. In addition, the information processing device 504, the server 508, and the user terminal 510 are connected to one another by a network 506.

The photographing device 500 is a device that photographs a moving image, such as a video camera. The photographing device 500 is, for example, disposed in a studio and photographs a moving image having a table and a wall as a background and a person as a foreground. High-resolution input images 202 illustrated in FIG. 6 are each a still image of one frame constituting the moving image.

The foreground region estimating device 502 generates estimated data indicating a region of the foreground from the image including the background and the foreground. Specifically, as illustrated in FIG. 6, the foreground region estimating device 502 generates two low-resolution input images 204 by downscaling two high-resolution input images 202. Here, the two high-resolution input images 202 and the two low-resolution input images 204 are input images including only the background and input images including the background and the foreground. Then, the foreground region estimating device 502 generates a low-resolution alpha image 206 indicating the region representing the person on the basis of the two low-resolution input images 204.

The information processing device 504 and the server 508 are each, for example, a computing device such as a personal computer. The information processing device 504 has a communicating function and performs data communication with the server 508 and the user terminal 510. Similarly, the server 508 has a communicating function and performs data communication with the information processing device 504 and the user terminal 510.

The user terminal 510 is, for example, a personal computer or a game machine. The user terminal 510 communicates with the server 508 and the information processing device 504 and displays received data. In addition, data generated by the user terminal 510 may be transmitted to the server 508 and the information processing device 504.

In the present embodiment, the information processing device 504, the server 508, or the user terminal 510 has the functions as the upscaling device. In a case where the information processing device 504 has the functions as the upscaling device, an upscaling program is installed on the information processing device 504. As illustrated in FIG. 6, the information processing device 504 obtains the low-resolution input image 204 for each frame from the foreground region estimating device 502. In addition, the information processing device 504 obtains the high-resolution input image 202 including the background and the foreground and the low-resolution input image 204 including the background and the foreground. The information processing device 504 generates a high-resolution alpha image from the high-resolution input image 202, the low-resolution input image 204, and the low-resolution alpha image 206 by the above-described method. Further, a merged image is generated on the basis of the high-resolution alpha image, the high-resolution input image 202, and a given background image. Then, the merged image thus generated is distributed to the user terminal 510 via the server 508 or directly. A user can thereby view the merged moving image.

In a case where the server 508 has the functions as the upscaling device, generation of the high-resolution alpha image is performed by the server 508. In this case, the low-resolution alpha image 206 is communicated between the server 508 and the information processing device 504 in place of the high-resolution alpha image. Hence, an amount of communication data can be reduced.

In a case where the user terminal 510 has the functions as the upscaling device, generation of the high-resolution alpha image is performed by the communication terminal. Also in this case, the low-resolution alpha image 206 is transmitted from the server 508 or the information processing device 504 to the user terminal 510 in place of the high-resolution alpha image. Hence, a data amount of communication performed by the user terminal 510 can be reduced. Further, in this case, the user can upload a merged image originally created to the server 508 and share the merged image with another user.

It is to be noted that the present invention is not limited to the foregoing embodiments. In addition, specific character strings and numerical values in the above description and specific character strings and numerical values in the drawings are merely illustrative, and not limitative.

The invention claimed is:

1. An upscaling device comprising:
processing circuitry configured to
obtain a high-resolution input image illustrating a background and a foreground, a low-resolution input image obtained by converting the high-resolution input image into a low-resolution image, and a low-resolution alpha image illustrating a region of the foreground in the low-resolution input image;
obtain correlation between gray scale information of the low-resolution input image and an alpha value of the low-resolution alpha image for each corresponding pixel pair of the low-resolution input image and the low-resolution alpha image, and upscale the correlation into a resolution of the high-resolution input image; and
output a high-resolution alpha image having a resolution same as that of the high-resolution input image on a basis of the high-resolution input image and the up scaled correlation.

2. The upscaling device according to claim 1, wherein the correlation includes a constant of a function indicating a relation between a gray scale value and an alpha value, and
the up scaling is performed by linear interpolation of the constant.

3. The up scaling device according to claim 2, wherein the function of the pixel pair indicates a relation of a predetermined number of pixel pairs on a periphery of the pixel pair.

4. The upscaling device according to claim 3, wherein the processing circuitry is configured to obtain a correlation coefficient indicating a degree of linear relation between the gray scale value and the alpha value, for each pixel pair, and,
using the correlation coefficient as a weighting factor, the processing circuitry is configured to obtain a weighted average of an alpha value calculated on a basis of the high-resolution input image and the up scaled correlation and an alpha value calculated by up scaling the low-resolution alpha image.

5. An up scaling method comprising:
obtaining a high-resolution input image illustrating a background and a foreground, a low-resolution input image obtained by converting the high-resolution input image into a low-resolution image, and a low-resolution alpha image illustrating a region of the foreground in the low-resolution input image;
obtaining correlation between gray scale information of the low-resolution input image and an alpha value of the low-resolution alpha image for each corresponding pixel pair of the low-resolution input image and the low-resolution alpha image, and up scaling the correlation into a resolution of the high-resolution input image; and
outputting a high-resolution alpha image having a resolution same as that of the high-resolution input image on a basis of the high-resolution input image and the upscaled correlation.

6. A non-transitory computer-readable medium including an up scaling program, which when executed by processing circuitry, causes the processing circuitry to:
obtain a high-resolution input image illustrating a background and a foreground, a low-resolution input image obtained by converting the high-resolution input image into a low-resolution image, and a low-resolution alpha image illustrating a region of the foreground in the low-resolution input image;
obtain correlation between gray scale information of the low-resolution input image and an alpha value of the low-resolution alpha image for each corresponding pixel pair of the low-resolution input image and the low-resolution alpha image, and up scaling the correlation into a resolution of the high-resolution input image; and
output a high-resolution alpha image having a resolution same as that of the high-resolution input image on a basis of the high-resolution input image and the up scaled correlation.

* * * * *